United States Patent
Zhen

(10) Patent No.: US 10,355,733 B2
(45) Date of Patent: Jul. 16, 2019

(54) PROTECTIVE DEVICE AND ELECTRONIC DEVICE WITH THE SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Feng Zhen, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/859,743

(22) Filed: Jan. 2, 2018

(65) Prior Publication Data

US 2018/0323817 A1 Nov. 8, 2018

(30) Foreign Application Priority Data

May 8, 2017 (CN) .......................... 2017 1 0316273

(51) Int. Cl.
*H04B 1/3888* (2015.01)
*A45C 11/00* (2006.01)

(52) U.S. Cl.
CPC ............ *H04B 1/3888* (2013.01); *A45C 11/00* (2013.01); *A45C 2011/002* (2013.01); *A45C 2011/003* (2013.01)

(58) Field of Classification Search
CPC .................................................. H04B 1/3833
See application file for complete search history.

(56) References Cited

U.S. PATENT DOCUMENTS

| | | | | |
|---|---|---|---|---|
| 2002/0187805 A1* | 12/2002 | Song | ........................ | H04M 1/22 455/556.1 |
| 2015/0311733 A1* | 10/2015 | Pliner | .................... | H02J 7/0042 320/111 |
| 2016/0262513 A1* | 9/2016 | O'Neill | .................. | A45C 11/00 |
| 2016/0376004 A1* | 12/2016 | Claridge | ................. | B64C 19/00 701/3 |
| 2018/0007184 A1* | 1/2018 | Palacino | ................ | H04B 1/385 |

* cited by examiner

*Primary Examiner* — Hsinchun Liao
(74) *Attorney, Agent, or Firm* — ScienBiziP, P.C.

(57) ABSTRACT

A protective device for a handheld electronic device includes a frame, at least one bending member, a first elastic member, and at least one rotation member. The frame is sheathed on an electronic device and protects the electronic device. The at least one bending member is mounted on the frame. The at least one rotation member is mounted under elastic rotational compression through the first elastic member and is latched with an end of the bending member. When the bending member is jarred to unlatch from the rotation member, the rotation member rotates out quickly and supports the electronic device.

18 Claims, 5 Drawing Sheets

PROTECTIVE DEVICE AND ELECTRONIC DEVICE WITH THE SAME

CROSS-REFERENCE TO RELATED APPLICATIONS

This application claims priority to Chinese Patent Application No. 201710316273.0 filed on May 8, 2017, the contents of which are incorporated by reference herein.

FIELD

The subject matter herein generally relates to impact protection of electronic devices, and particularly to a protective device and an electronic device with the same.

BACKGROUND

Portable electronic devices, such as smart phones and tablet computers, are widely used. The electronic devices may be dropped during use, which may lead to damages. Improvement in the art is preferred.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
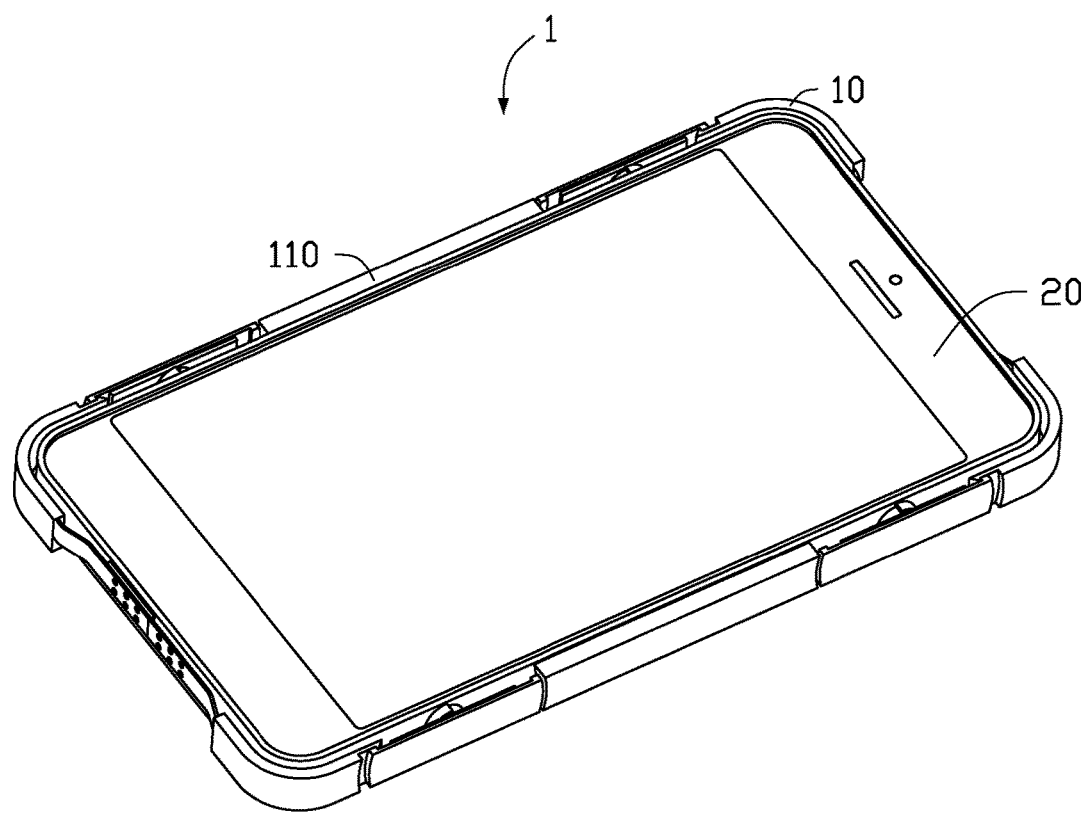
FIG. 1 is a schematic diagram illustrating an exemplary embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" exemplary embodiment in this disclosure are not necessarily to the same exemplary embodiment, and such references mean "at least one".

The term "comprising" means "including, but not necessarily limited to", it specifically indicates open-ended inclusion or membership in a so-described combination, group, series, and the like.

FIG. 1 illustrates an exemplary embodiment of an electronic device 20. The electronic device 20 includes a protective device 10. The protective device 10 is mounted on an outer surface of the electronic device 20. The protective device 10 protects the electronic device 20 from being damaged when the electronic device 20 is dropped.

Figure 2:
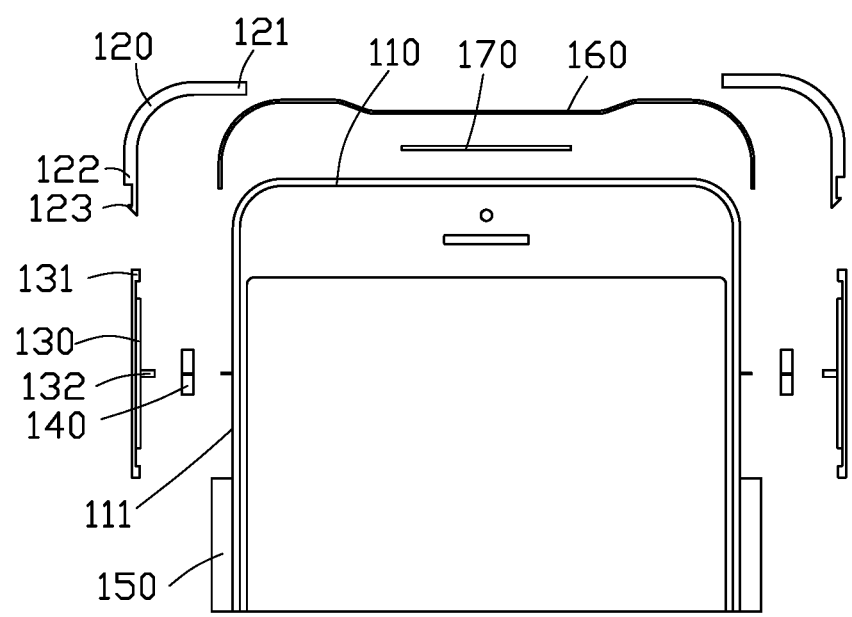
FIG. 2 is an exploded view of the electronic device in FIG. 1.
Figure 3:
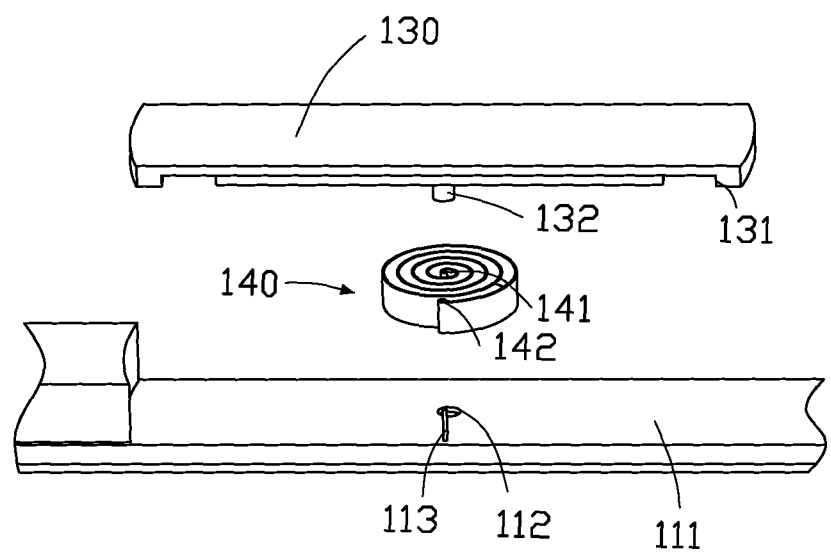
FIG. 3 is a schematic diagram illustrating a first elastic member of the electronic device in FIG. 1.
Figure 4:
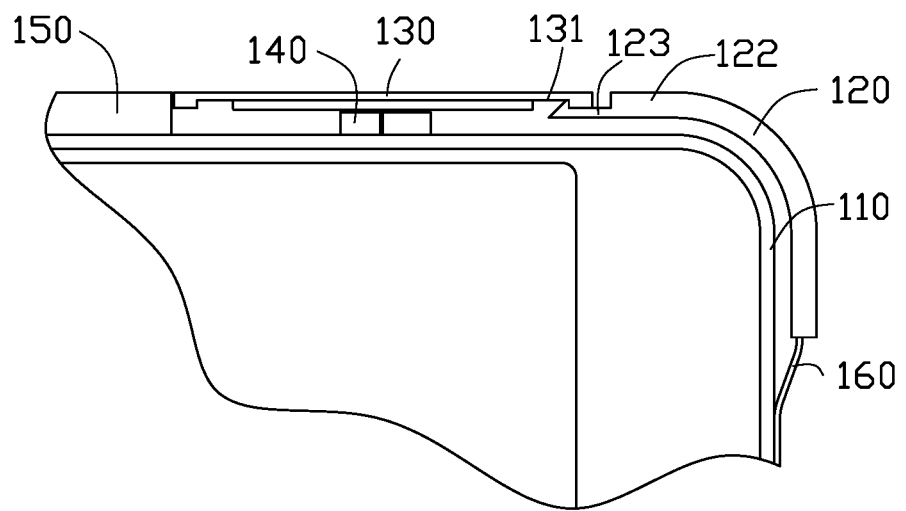
FIG. 4 is a schematic diagram illustrating the electronic device in FIG. 1 in a non-impact state.

Referring to FIGS. 2-4, the protective device 10 includes a frame 110, at least one bending member 120, at least one rotation member 130, and a first elastic member 140. A shape of the frame 110 matches with a shape of the electronic device 20, the frame 110 is sheathed on the outer surface of the electronic device 20 to protect the electronic device 20.

The frame 110 defines at least one gap 111, and a first connection member 150 is formed on both sides of the frame 110. In at least one exemplary embodiment, the frame 110 defines two gaps 111. The gap 111 is substantially U-shaped as shown in FIG. 2 in the exemplary embodiment. The gap 111 is extended from one side to a top end of the frame 110, and is extended to another side of the frame 110. The bending member 120, the rotation member 130, and the first elastic member 140 are arranged in the gap 111. A thickness of the first connection member 150 is the same as a height of the bending member 120 and a height of the rotation member 130, a surface of the first connection member 150 is thus flushed with surfaces of the bending member 120 and the rotation member 130.

The rotation member 130 is elastically mounted on the frame 110 through the first elastic member 140. An end of the rotation member 130 is latched with an end of the bending member 120. When the bending member 120 is detached from the rotation member 130, the first elastic member 140 can drive the rotation member 130 to rotate by an elastic restoring force. For example, when suffering impact, the bending member 120 can be removed from and not latched to the rotation member 130 as the bending member 120 is impacted, then the rotation member 130 can instantly rotate and extend to support the electronic device 20, thus protecting the outer surface or a display screen of the electronic device 20 from impact when the electronic device 20 is dropped.

As illustrated in FIG. 2, in at least one exemplary embodiment, the protective device 10 includes four bending members 120. Each of the four bending members 120 is arranged in a gap 111 and the four bending members 120 are respectively located in four corners of the frame 110. The bending member 120 includes a fixing end 121 and a latching end 122. The fixing end 121 is mounted on the frame 110, such as the top end of the gap 111. The latching end 122 defines a latching member 123, the latching member 123 can be a hook, which latches with the rotation member 130.

The protective device 10 further includes at least one second elastic member 160. In at least one exemplary embodiment, the protective device 10 includes two second elastic members 160. The second elastic member 160 mounts the fixing end 121 to the frame 110 and provides an elastic force to unlock the rotation member 130.

In at least one exemplary embodiment, the second elastic member 160 is molded on the bending member 120 by insert molding. The second elastic member 160 connects with the two bending members 120. Middle portions of the two second elastic members 160 are respectively mounted on two opposite sides of the frame 110. In at least one exemplary embodiment, the second elastic member 160 can be an elastic strip, an initial state of the second elastic member 160 is in a free state, that is, the second elastic member 160 is not stretched or compressed.

In at least one exemplary embodiment, the protective device 10 further includes a second connection member 170. The second connection member 170 is mounted on the frame 110 by injection molding. For example, the second elastic member 160 defines a laser-welding point (not shown) on a middle position, the middle part of the second elastic member 160 can be laser-welded on the second connection member 170, so the second elastic member 160 is mounted on the frame 110.

In other exemplary embodiments, the four bending members 120 can be made from elastic material so that the second elastic member 160 can be removed.

In at least one exemplary embodiment, the protective device 10 includes four rotation members 130 and four first elastic members 140. Opposite sides of the frame 110 each defines two rotation members 130 at intervals. Each rotation member 130 is elastically mounted on the frame 110 through the first elastic member 140, and latched with the bending member 120. As illustrated in FIG. 3, in at least one exemplary embodiment, the first elastic member 140 can be a spiral spring. The first elastic member 140 includes a spindle hole 141 and a location hole 142, an initial state of the first elastic member 140 is under compression.

As illustrated in FIG. 4, in at least one exemplary embodiment, the rotation member 130 defines a clamping member 131 on an end near the bending member 120. When the electronic device 20 is in a non-impact state, the clamping member 131 is connected to the latching member 123 of the bending member 120. A latching of the rotation member 130 requires placing the first elastic member 140 under compression.

The rotation member 130 further defines a rotation spindle 132 as shown in FIG. 3. The frame 110 defines a through hole 112 and a location pin 113. The rotation spindle 132 passes through the spindle hole 141 of the first elastic member 140 and the through hole 112 of the frame 110, and fixes the rotation member 130 and the first elastic member 140 on the frame 110. The location pin 113 passes through the location hole 142 and fixes an end of the first elastic member 140 on the frame 110.

Figure 5:
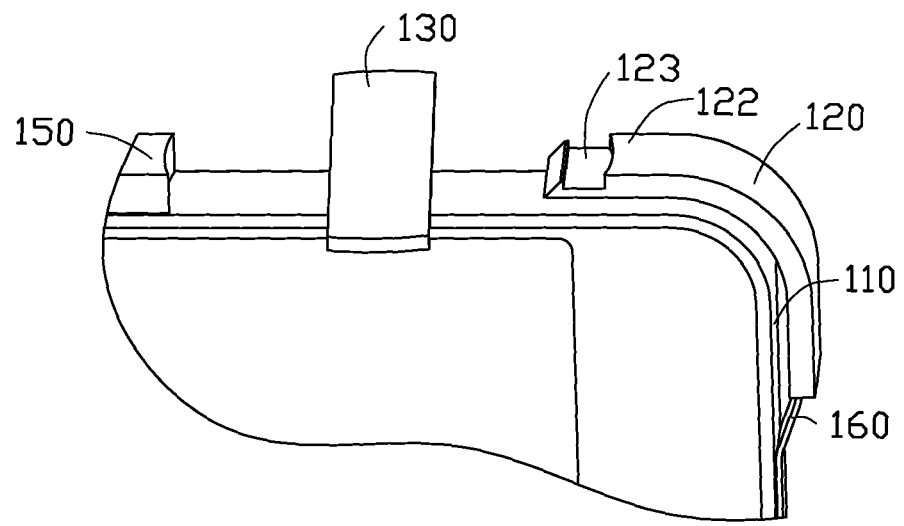
FIG. 5 is a schematic diagram illustrating the electronic device in FIG. 1 in an impact state.

Referring to FIGS. 4 and 5, when the electronic device 20 is dropped, impact is likely to occur at least one bending member 120 of the protective device 10. When one of the bending members 120 is impacted, the second elastic member 160 is elastically deformed, and the latching end 122 of the bending member 120 is driven to move inward towards the frame 110. Thus, the latching member 123 is no longer latched with the clamping member 131, and the first elastic member 140 can be instantly rotated to drive the rotation member 130 to rotate about the rotation spindle 132. The rotation member 130 also extends as the rotation member 130 rotates about the rotation spindle 132, such that the rotation member 130 forms an angle with the frame 110 as shown in FIG. 5, then the rotation member 130 can support the device 20, thus preventing the outer surface or the display screen of the electronic device 20 from being damaged.

In at least one exemplary embodiment, the latching end 122, two ends of the rotation members 130, and two ends of the first connection member 150 are both arc-shaped, which facilitates rotation of the rotation member 130 relative to the bending member 120 and the first connection member 150.

In at least one exemplary embodiment, when the electronic device 20 is dropped, the corners of the electronic device 20 can be protected by means of the structure of the bending member 120 and the second elastic member 160 being located at the four corners of the electronic device 20. The support by the rotation member 130 protects the outer surface and the display screen of the electronic device 20.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A protective device comprising:
    a frame covering an outer surface of an electronic device, wherein the frame defines at least one gap, a first connection member is formed on two sides of the frame, the gap is substantially U-shaped, the gap is extended form one side to a top end of the frame, and further extended to the other side of the frame;
    at least one bending member mounted on the frame;
    a first elastic member; and
    at least one rotation member mounted on the frame through the first elastic member and latched to an end of the at least one bending member, wherein when the bending member is detached from the rotation member, the rotation member rotates and supports the electronic device.

2. The protective device according to claim 1, wherein the at least one bending member comprises a fixing end and a latching end, the fixing end is mounted on the frame, the latching end defines a latching member, the rotation member defines a clamping member on an end proximate to the bending member, the clamping member is connected to the latching member such that the rotation member is latched to the latching end.

3. The protective device according to claim 2, further comprising:
    two second elastic members mounting the fixing end to the frame, and providing an elastic force to unlock the rotation member.

4. The protective device according to claim 2, wherein the protective device comprises four rotation members and four first elastic members, opposite sides of the frame each defines two of the rotation members at intervals; wherein each one of the rotation members is elastically mounted on the frame through the first elastic member and latched to a corresponding one of the bending members.

5. The protective device according to claim 4, wherein the first elastic member is a spiral spring, the first elastic spring comprises a spindle hole, the rotation member further defines a rotation spindle, the frame defines a through hole; wherein the rotation spindle passes through the spindle hole and the through hole, and fixes the rotation member and the first elastic member on the frame.

6. The protective device according to claim 5, wherein the first elastic member is a spiral spring, and an initial state of the first elastic member is under compression.

7. The protective device according to claim 5, wherein the first elastic spring further comprises a location hole, the frame defines a location pin, the location pin passes through the location hole and fixes an end of the first elastic member to the frame.

8. The protective device according to claim 4, wherein the latching end, two ends of the rotation members, and two ends of the first connection member are arc-shaped.

9. The protective device according to claim 1, wherein the frame defines two gaps, the protective device comprises four of the at least one bending member.

10. An electronic device comprising:
a main body; and
a protective device mounted on the main body, comprising:
 a frame covering an outer surface of an electronic device, wherein the frame defines at least one gap, a first connection member is formed on two sides of the frame, the gap is substantially U-shaped, the gap is extended form one side to a top end of the frame, and further extended to the other side of the frame;
 at least one bending member mounted on the frame;
 a first elastic member; and
 at least one rotation member mounted on the frame through the first elastic member and latched to an end of the at least one bending member, wherein when the bending member is detached from the rotation member, the rotation member rotates and supports the electronic device.

11. The electronic device according to claim 10, wherein the at least one bending member comprises a fixing end and a latching end, the fixing end is mounted on the frame, the latching end defines a latching member, the rotation member defines a clamping member on an end proximate to the bending member, the clamping member is connected to the latching member of the bending member such that the rotation member is latched to the latching end.

12. The electronic device according to claim 11, further comprising:
two second elastic members mounting the fixing end to the frame, and providing an elastic force to unlock the rotation member.

13. The electronic device according to claim 11, wherein the protective device comprises four rotation members and four first elastic members, opposite sides of the frame each define two of the rotation members at intervals; wherein each one of the rotation members is elastically mounted on the frame through the first elastic member, and latched to a corresponding one of the bending members.

14. The electronic device according to claim 13, wherein the first elastic member is a spiral spring, the first elastic member comprises a spindle hole, the rotation member further defines a rotation spindle, the frame defines a through hole; wherein the rotation spindle passes through the spindle hole and the through hole, and fixes the rotation member and the first elastic member on the frame.

15. The electronic device according to claim 14, wherein the first elastic member is a spiral spring, and an initial state of the first elastic member is under compression.

16. The electronic device according to claim 14, wherein the first elastic spring further comprises a location hole, the frame defines a location pin, the location pin passes through the location hole and fixes an end of the first elastic member to the frame.

17. The electronic device according to claim 13, wherein the latching end, two ends of the rotation members, and two ends of the first connection member are arc-shaped.

18. The electronic device according to claim 10, wherein the frame defines two gaps, the protective device comprises four of the at least one bending member.

* * * * *